United States Patent
Kleine et al.

(10) Patent No.: US 9,720,421 B2
(45) Date of Patent: Aug. 1, 2017

(54) SUBSEA PRODUCTION SYSTEM WITH MULTIPLE LOCATION MASTER CONTROL STATION SYSTEM

(75) Inventors: Ulrich Kleine, Langenhagen (DE); Roger Seeck, Nienburg (DE); Björn Wiegert, Bröckel (DE)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 14/352,298

(22) PCT Filed: Oct. 17, 2011

(86) PCT No.: PCT/EP2011/005209
§ 371 (c)(1),
(2), (4) Date: Aug. 5, 2014

(87) PCT Pub. No.: WO2013/056719
PCT Pub. Date: Apr. 25, 2013

(65) Prior Publication Data
US 2014/0367113 A1    Dec. 18, 2014

(51) Int. Cl.
*G05D 7/06* (2006.01)
*E21B 33/03* (2006.01)
(Continued)

(52) U.S. Cl.
CPC ....... *G05D 7/0617* (2013.01); *E21B 33/0355* (2013.01); *E21B 41/0007* (2013.01);
(Continued)

(58) Field of Classification Search
None
See application file for complete search history.

(56) References Cited

U.S. PATENT DOCUMENTS

| | | | | |
|---|---|---|---|---|
| 3,865,142 A | * | 2/1975 | Begun ................ | E21B 33/0355 137/236.1 |
| 4,174,000 A | * | 11/1979 | Milberger ........... | E21B 33/0355 137/236.1 |

(Continued)

FOREIGN PATENT DOCUMENTS

| | | |
|---|---|---|
| GB | 2432175 A | 5/2007 |
| GB | 244867 | 2/2008 |

(Continued)

OTHER PUBLICATIONS

International Search Report and Written Opinion dated Jun. 7, 2012 for PCT Application No. PCT/EP2011/005209 filed on Oct. 17, 2011.

*Primary Examiner* — Matthew R Buck
*Assistant Examiner* — Douglas S Wood
(74) *Attorney, Agent, or Firm* — Chamberlain Hrdklicka

(57) ABSTRACT

A subsea production system for producing fluids from a subsea well in a subsea field. The production system includes a production facility and a production umbilical connecting the subsea well with the production facility. The production system also includes a control system for controlling production from the subsea well. The control system includes a first redundant master control station system (redundant MCS) at a first location, the redundant MCS capable of controlling production from the subsea well. The control system also includes a second redundant MCS at a second location, the second redundant MCS capable of controlling production from the subsea well. The redundant MCSs are synchronized to keep the same electronic data at both locations and to prevent conflicts in control signals from the redundant MCSs.

19 Claims, 2 Drawing Sheets

(51) Int. Cl.
    *E21B 43/017*     (2006.01)
    *G05B 15/02*     (2006.01)
    *G01N 27/00*     (2006.01)
    *E21B 33/035*     (2006.01)
    *H04L 29/08*     (2006.01)
    *G06F 11/20*     (2006.01)
    *E21B 41/00*     (2006.01)
    *G06F 11/16*     (2006.01)

(52) U.S. Cl.
    CPC ............ *E21B 43/017* (2013.01); *G05B 15/02* (2013.01); *G06F 11/2035* (2013.01); *G06F 11/2097* (2013.01); *H04L 67/1095* (2013.01); *G06F 11/165* (2013.01); *G06F 11/1629* (2013.01); *G06F 11/1654* (2013.01); *H04L 67/12* (2013.01)

(56) References Cited

U.S. PATENT DOCUMENTS

| | | | |
|---|---|---|---|
| 7,958,938 B2 * | 6/2011 | Crossley | E21B 43/017 166/339 |
| 8,781,743 B2 * | 7/2014 | McKay et al. | 702/6 |
| 9,322,264 B2 * | 4/2016 | Gutierrez | E21B 33/063 |
| 2004/0262008 A1 | 12/2004 | Deans et al. | |
| 2006/0064256 A1 * | 3/2006 | Appleford | E21B 43/12 702/31 |

FOREIGN PATENT DOCUMENTS

| | | |
|---|---|---|
| GB | 2440867 | 2/2008 |
| WO | 2007027080 A2 | 3/2007 |
| WO | 2008049055 | 4/2008 |

\* cited by examiner

SUBSEA PRODUCTION SYSTEM WITH MULTIPLE LOCATION MASTER CONTROL STATION SYSTEM

BACKGROUND

A subsea production system comprises a wellhead, subsea production tree equipment, pipelines, structures, and a piping system, etc., and, in many instances, a number of wellheads are controlled from a single location. A subsea control system is part of a subsea production system. The control system provides operation of valves and chokes on subsea completions, templates, manifolds and pipelines. Proper performance of the control system ensures reliable and safe operation of the production equipment.

The control of various production functions, executed at the sea bed, is carried out from a topside production facility (a platform or a floating vessel). The selection of the type of control system is dictated predominantly by technical factors like the distance between control points (offset distance between the platform and the tree), water depth, required speed of response during execution of subsea functions and type of subsea installation (single or multiple wellheads).

Topside control system equipment comprises a hydraulic power unit (HPU), an electronic power unit (EPU), and a well control panel. The HPU provides high and low-pressure hydraulic supplies and is usually powered by electric motors. The topside control system also comprises a Master Control Station (MCS). The MCS is a dedicated system that controls and retrieves data from subsea equipment on the ocean floor through subsea control modules (SCM) connected with subsea equipment, such as valves on the subsea production tree. Typically, a power and electronic control signal umbilical connects the MCS and SCMs but the connection may be wireless as well. The electrical control cables supplying power and control signals can either be bundled with hydraulic lines or laid separately.

The production control system provides control of all functions of the subsea production system. The production control systems, as such, are only concerned with controlling production and safety valves and monitoring devices and are not used to provide control of subsea connector latching and unlatching or operation of vertical access valves, for example. Typically, subsea functions include operation/control of: (1) a downhole safety valve (DHSV); (2) subsea chokes; (3) production valves mounted on the subsea production tree; and (4) utility functions such as monitoring of fluid characteristics, pressure leakage and valve positions, etc.

Positioned between the distributed control system (DCS) on the platform and the subsea equipment, the MCS maintains safe operating conditions, optimizing production across a field and effectively managing reserves.

The MCS includes electronic databases that serve as the communication link to the Distributed Control System (DCS), Hydraulic Power Unit (HPU), and Electrical Power Unit (EPU).

The MCS typically has three main layers: (1) a user interface, (2) logic/control, and (3) subsea communications to control components on the ocean floor. The MCS may use two complete and segregated channel networks to simultaneously monitor data functions to and from each other, as well as between surface and subsea equipment. The MCS communicates with the SCMs through subsea gateways that each consist of an SCM communication application and a database client. The logic component typically comprises a Programmable Logic Controller (PLC) system. However, PLCs can be limited in their expansion capabilities, ease of use and maintainability, remote monitoring, condition monitoring, and interfacing with third party equipment.

Traditionally for offshore production systems, the MCS is a redundant system that controls the subsea production system from one location, such as offshore, or a second location, such as onshore.

BRIEF DESCRIPTION OF THE DRAWINGS

For a detailed description of the preferred embodiments of the invention, reference will now be made to the accompanying drawings in which.

DETAILED DESCRIPTION

Figure 1:
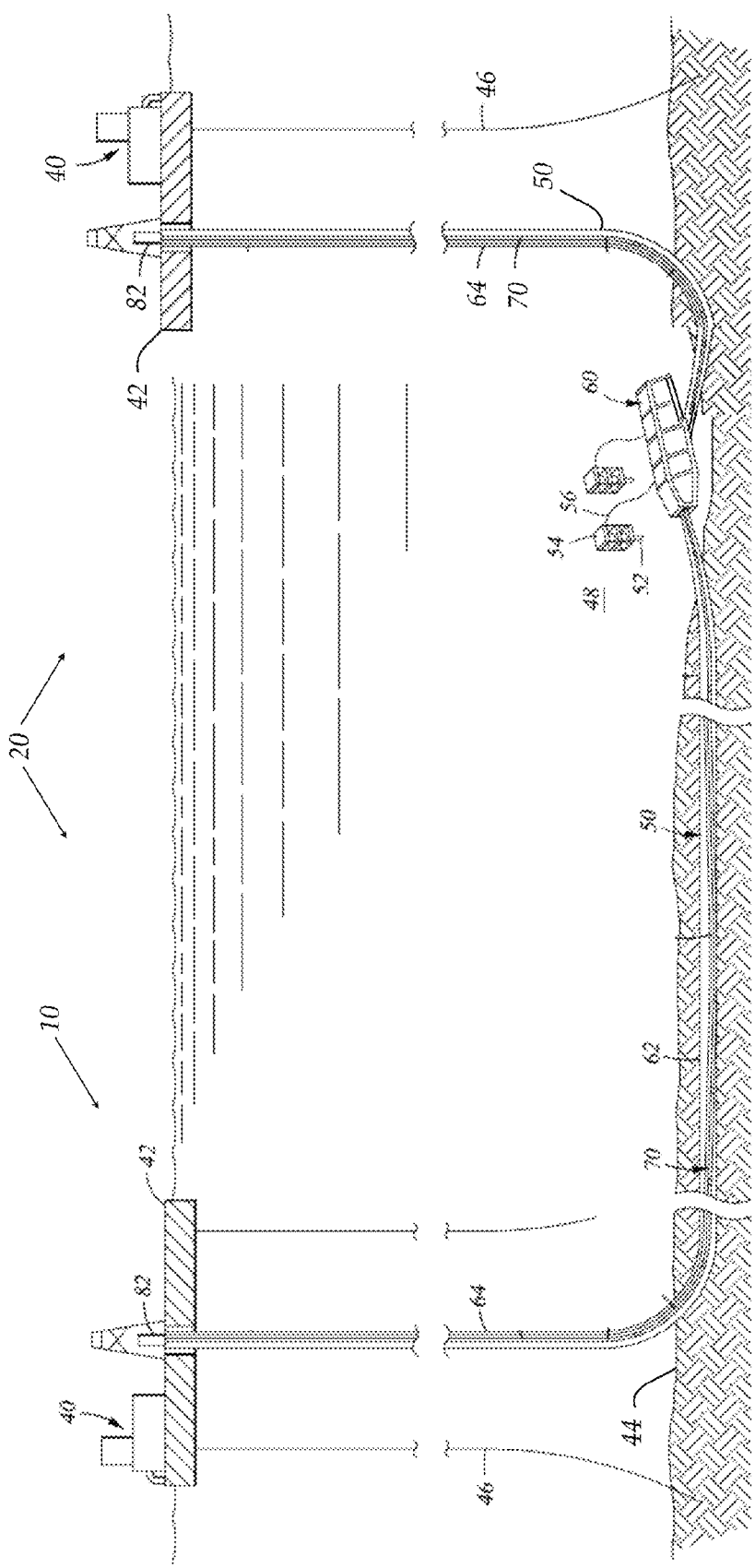
FIG. 1 shows a schematic exemplary subsea production system 10 of an embodiment of the invention.

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

FIG. 1 shows an exemplary subsea production system 10 of the present invention. According to some embodiments, the subsea production system 10 includes at least two production facilities 40 disposed on platforms 42. In deep water, the platforms 42 may be a floating platform, such as a SPAR or a tension leg platform anchored to the ocean floor 44 by wire lines 46, or another type of floating vessel such as a floating production storage and off take vessel (FPSO). It should also be appreciated that one of the production facilities may be located on shore. The production facilities 40 process the well fluids produced from preferably a plurality of fields, such as field 48 (only one field 48 is shown), including a plurality of producing wells 52. Each well 52 has a subsea production tree 54 with an individual flowline 56 extending from each tree 54 to a manifold 60 where the well fluids produced from the wells 52 are commingled for transport to one or both production facilities 40. It should be appreciated that the manifold 60 and the trees 54 have a plurality of valves for controlling flow and that the trees 54 include production control equipment, such as chokes and blowout preventers, to control the operation of the manifold 60 and the production of the wells 52, as is well known in the art. Appropriate power and electronic control signal cables are also connected to the subsea equipment. It should also be appreciated that one or more than two production facilities 40 may also be used.

Subsea flowlines 50 extend from the subsea manifold 60 back to the platforms 42 and may include a generally horizontal portion 62 connected to or as an integral part of a riser portion 64 extending from the sea floor 44 to the platform 42. It should be appreciated that the manifold 60 is not necessary and that the production flowline may extend from the subsea production trees 54. The manifold 60 may be disposed many miles from the production facilities 40. It should be appreciated that although only one manifold 60 is shown for clarity, there may be a plurality of manifolds 60 and producing fields 48 with well fluids being pumped to production facilities 40 for processing.

A subsea control system 20 is also part of the subsea production system 10. The subsea control system 20 provides operation of valves and chokes on the subsea completions such as the production trees 54, templates, manifold 60, and pipelines. The subsea control system 20 is configured as a multiple location redundant MCS system with at least two redundant MCS s 82 in different locations, such as the platforms 42. Thus, the subsea control system 20 can control the subsea components from multiple locations, such as both offshore and onshore, with more than one redundant MCS system 82. Each redundant MCS system 82 communicates with the subsea wells 52 through a power and electronic control signal umbilical 70 extending from each redundant MCS 82. It should also be appreciated that the redundant MCSs 82 do not need to necessarily be located at a production facility 40, but only need to be able to communicate with the subsea equipment as well as the other redundant MCSs 82.

Figure 2:
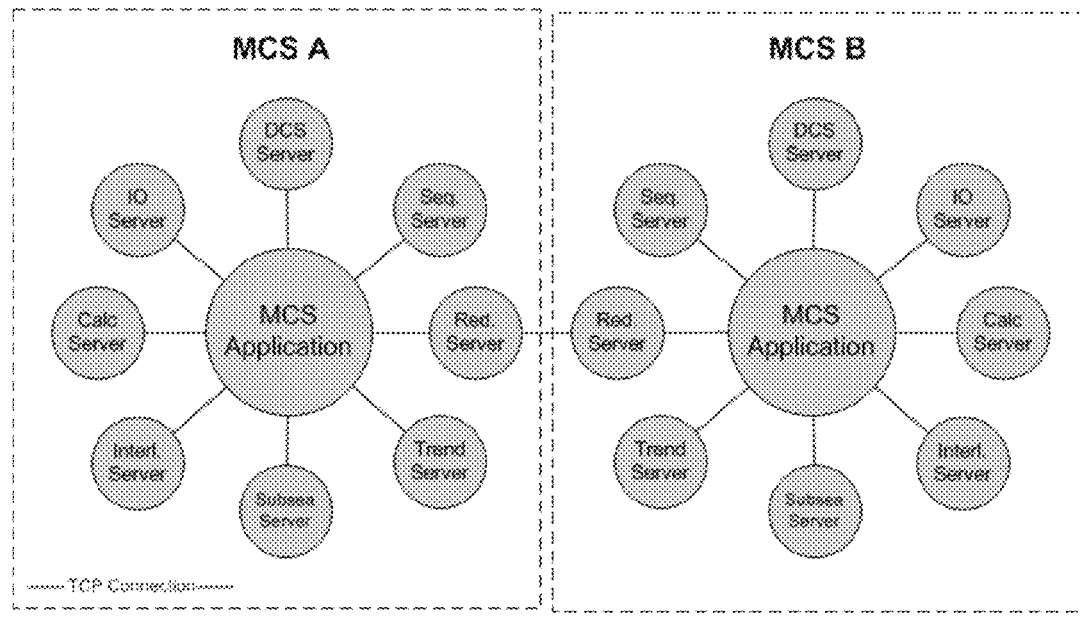
FIG. 2 shows a schematic model of a redundant MCS software and network configuration for a single redundant MCS.

FIG. 2 shows an example model of a redundant MCS software configuration for a single redundant MCS 82. Preferably, the logic and control functionality of each redundant MCS 82 is carried out using a Linux-based operating system (OS), however, any appropriate OS may be used. The MCS OS may, for example, be based on a stable Debian Distribution scaled to the requirements of an oil and gas production system. The MCS software operates based on a continuous data traffic flow between servers which are running at the same time. This means that all programs, which need data for display or store data in databases, always receive data from or send data to a server. The connection to the servers may be based on a TCP/IP connection. This data setup offers an extremely high data transparency over network connections. However, it is not necessary that the data requesting program and the server run on the same computer system. The individual servers in this structure have special tasks that are optimally distributed within the system to fulfil the needs of an oil and gas production field. In case of an error on one of the servers a bumpless transfer to the redundant partner server will occur. The advantage of this active redundancy is that the whole MCS is not affected by a fault of a single server. Stopping, modifying, and starting individual servers can be done during runtime without compromising the complete MCS.

Figure 3:
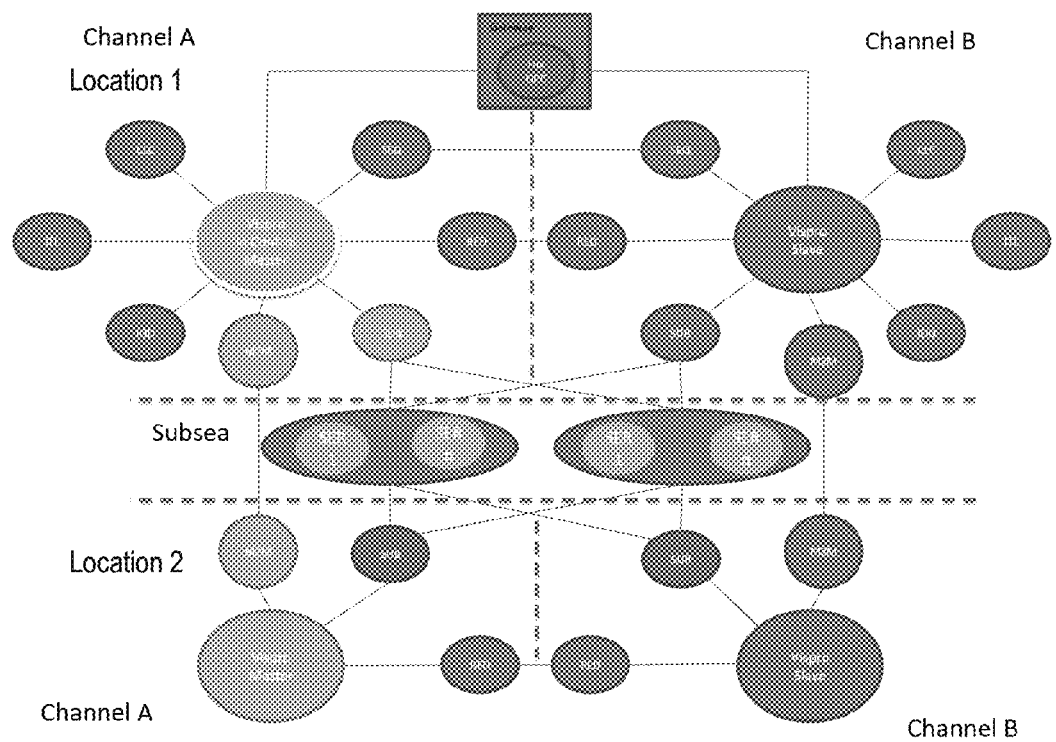
FIG. 3 shows a schematic model of a multiple redundant MCS system software and network configuration.

FIG. 3 shows an example model of the multiple redundant MCS system software and network configuration. To control the subsea production system 10 from multiple locations, the redundant MCSs 82 are connected using a data network and synchronized such that only one MCS 82 is controlling components at one time. This synchronization keeps the data at both MCS systems up to date and also reconciles any conflicts between commands received from different locations.

Each redundant MCS 82 provides full functionality, which includes individual MCS, EPU, HPU, DCS and ESD interfaces, etc. Each redundant MCS 82 is also able to take over full control in case of emergencies. Thus, in case one redundant MCS 82 fails and can no longer control the subsea production system components, the remaining redundant MCSs 82 could still control the components. Thus, the subsea control system 20 must be able to control the subsea production trees 54 and manifold 60 from either redundant MCS 82.

The subsea control system 20 is also be capable of controlling mixed configurations where some subsea production trees 54 are controlled from one redundant MCS 82 and some are controlled from another redundant MCS 82. Which subsea production trees 54 are controlled by which redundant MCS 82 can be changed at any time depending on the desired production configuration.

As previously mentioned, the subsea production system 20 may also operate in different configurations as to the number and location of the fields 82. For example, there may also be multiple fields 48 with multiple wells 52 and trees 54 at each field 48. The subsea control system 20 would still be configured as a multiple location redundant MCS system with at least two redundant MCSs 82 in different locations.

Different combinations of the above configurations may also be used for a given subsea production system 10 depending on the desired production and control locations.

Although the present invention has been described with respect to specific details, it is not intended that such details should be regarded as limitations on the scope of the invention, except to the extent that they are included in the accompanying claims.

What is claimed is:

1. A subsea control system for controlling production from a subsea field with a subsea well using a subsea control module, comprising:

a first redundant master control station system (redundant MCS) at a first location, wherein the redundant MCS is in communication with the subsea control module and configured to control production from the subsea well through the subsea control module;

a second redundant MCS at a second location, wherein the second redundant MCS is in communication with the subsea control module and configured to control production from the subsea well through the subsea control module;

wherein the first and second redundant MCSs are synchronized by keeping electronic data the same at both locations via communication between the redundant MCSs to prevent conflicts in control signals from the redundant MCSs; and wherein either and both of the first and second redundant MCSs are configured to control production through the subsea control module.

2. The subsea control system of claim 1, wherein only one redundant MCS at a time controls production from the well.

3. The subsea control system of claim 1, wherein the redundant MCSs control production from the well to at least two production facilities in different locations.

4. The subsea control system of claim 1, wherein the redundant MCSs control production from more than one subsea field with more than one subsea well in each field.

5. The subsea control system of claim 1, wherein one redundant MCS is located offshore and the other redundant MCS is located on shore.

6. The subsea control system of claim 1, wherein each redundant MCS is located offshore.

7. The subsea control system of claim 1, further comprising more than two redundant MCS s.

8. The subsea control system of claim 1, wherein the field comprises more than one well and the redundant MCSs are capable of controlling production from all or some of the wells.

9. The subsea control system of claim 8, wherein the wells a given redundant MCS is controlling can be changed at any time.

10. A subsea production system for producing fluids from a subsea well in a subsea field, comprising:
a production facility;
a production umbilical connecting the subsea well with the production facility; and
a control system configured to control production from the subsea well, the control system comprising:
a subsea control module;
a first redundant master control station system (redundant MCS) at a first location, wherein the redundant MCS is in communication with the subsea control module and configured to control production from the subsea well through the subsea control module;
a second redundant MCS at a second location, wherein the second redundant MCS is in communication with the subsea control module and configured to control production from the subsea well through the subsea control module;

wherein the first and second redundant MCSs are synchronized by keeping electronic data the same at both locations via communication between the redundant MCSs to prevent conflicts in control signals from the redundant MCSs; and wherein either and both of the first and second redundant MCSs are configured to control production through the subsea control module.

11. The subsea production system of claim 10, wherein only one redundant MCS at a time controls production from the well.

12. The subsea production system of claim 10, further comprising:
more than one production facility at different locations; and
wherein the redundant MCSs control production from the well to the production facilities.

13. The subsea production system of claim 10, wherein the redundant MCSs control production from more than one subsea field with more than one subsea well in each field.

14. The subsea production system of claim 10, wherein one redundant MCS is located offshore and the other redundant MCS is located on shore.

15. The subsea production system of claim 10, wherein each redundant MCS is located offshore.

16. The subsea production system of claim 10, further comprising more than two redundant MCSs.

17. The subsea production system of claim 10, wherein the field comprises more than one well and the redundant MCSs are capable of controlling production from all or some of the wells.

18. The subsea production system of claim 17, wherein the wells a given redundant MCS is controlling can be changed at any time.

19. The subsea production system of claim 10, wherein the first and second redundant MCSs comprise a user interface, logic/control, and subsea communications.

* * * * *